United States Patent
Sabatino (10) Patent No.: US 7,146,147 B1
(45) Date of Patent: Dec. 5, 2006

(54) AIRCRAFT WIRELESS COMMUNICATION SYSTEM AND METHOD

(75) Inventor: Anthony Sabatino, Lenexa, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 498 days.

(21) Appl. No.: 09/597,530

(22) Filed: Jun. 20, 2000

(51) Int. Cl.
*H04B 1/10* (2006.01)

(52) U.S. Cl. .................. 455/300; 455/431; 343/705

(58) Field of Classification Search ........... 455/300, 455/13.1, 427, 431, 428, 12.1, 435, 406, 455/408, 414, 432, 432.1, 414.1, 435.1; 342/2, 342/157; 343/705
See application file for complete search history.

(56) References Cited

U.S. PATENT DOCUMENTS

| | | | |
|---|---|---|---|
| 3,680,115 A * | 7/1972 | Bickel et al. | 342/396 |
| 4,916,460 A * | 4/1990 | Powell | 343/853 |
| 5,029,958 A * | 7/1991 | Hodge et al. | 385/100 |
| 5,274,391 A * | 12/1993 | Connolly | 343/820 |
| 5,278,891 A | 1/1994 | Bhaget et al. | |
| 5,408,515 A | 4/1995 | Bhaget et al. | |
| 5,444,762 A | 8/1995 | Frey et al. | |
| 5,519,761 A | 5/1996 | Gilhousen | |
| 5,557,656 A | 9/1996 | Ray et al. | |
| 5,559,865 A * | 9/1996 | Gilhousen | 455/431 |
| 5,757,322 A | 5/1998 | Ray et al. | |
| 5,832,380 A | 11/1998 | Ray et al. | |
| 5,848,359 A | 12/1998 | Furtaw | |
| 5,878,345 A | 3/1999 | Ray et al. | |
| 5,878,346 A | 3/1999 | Ray et al. | |
| 5,884,166 A | 3/1999 | Ray et al. | |
| 5,887,258 A | 3/1999 | Lemozit et al. | |
| 5,960,343 A | 9/1999 | Ray et al. | |
| 5,995,833 A | 11/1999 | Zicker | |
| 6,032,020 A | 2/2000 | Cook et al. | |
| 6,055,425 A * | 4/2000 | Sinivaara | 455/431 |
| 6,108,539 A | 8/2000 | Ray et al. | |

(Continued)

FOREIGN PATENT DOCUMENTS

EP 0998062 5/2000

(Continued)

OTHER PUBLICATIONS

Interwave Delivers Wireless Network Technology in Innovative Aircraft Application, Jul. 26, 2000, www.iwv.com/nt/press/BAE72600.html (printed Apr. 5, 2001).

(Continued)

*Primary Examiner*—Nick Corsaro
*Assistant Examiner*—Nghi H. Ly (57) ABSTRACT

A system and method for providing wireless communication services to passengers of an aircraft. An incoming signal is received from a base station at an external antenna on the aircraft. The incoming signal is converted to a low-energy signal type to be conveyed across a low-energy transmission medium. The low-energy signal may be light energy and the low-energy transmission medium may be a fiber optic cable, for example. The signal is converted to a signal type that can be transmitted into the passenger compartment for reception by one or more wireless handsets. Outgoing signals transmitted by the one or more wireless handsets may also be received and converted to low-energy signals for transmission on a low-energy signal path, which may be the same as or different from the incoming signal path. The outgoing signals may then be transmitted through an external antenna on the aircraft to be received by a base station.

24 Claims, 6 Drawing Sheets

U.S. PATENT DOCUMENTS

| | | | |
|---|---|---|---|
| 6,269,243 B1 * | 7/2001 | Corbefin et al. | 455/431 |
| 6,272,344 B1 * | 8/2001 | Kojima | 455/435 |
| 6,285,878 B1 * | 9/2001 | Lai | 449/13 |
| 6,321,084 B1 * | 11/2001 | Horrer | 455/431 |
| 2002/0094829 A1 * | 7/2002 | Ritter | 455/556 |

FOREIGN PATENT DOCUMENTS

| | | | |
|---|---|---|---|
| GB | 2310973 | | 9/1997 |
| JP | 362149202 A | * | 7/1987 |
| JP | 408167786 A | * | 6/1996 |
| WO | 9428684 | | 12/1994 |
| WO | 9602093 | | 1/1996 |
| WO | 9602094 | | 1/1996 |

OTHER PUBLICATIONS

I.E. Casewell, The Provision of GSM Cellular Radio Environments within Passenger Aircraft Operating over Europe, pp. 172-176.

Roger McKinlay, Phoning and Flying, IEEE Review, Mar. 1998, pp. 85-88.

Litenna™ in Off-Air Repeater Application, Foxcom Wireless Application Note, Document No. 14-001-12A, Copyright 1999.

RFiber™—RF Fiberoptic Links for Wireless Applications, Foxcom Wireless Application Book, Document No. 41-14-001-10E, Copyright 1998.

Litenna™ In-Building RF Distribution System, Foxcom Wireless White Paper, Document No. 42-14-001-09C, Copyright 1998.

* cited by examiner

FIG. 5

AIRCRAFT WIRELESS COMMUNICATION SYSTEM AND METHOD

FIELD OF THE INVENTION

The present invention relates to a system and method for providing wireless communication service in an aircraft. More particularly, embodiments of the invention relate to providing wireless communication service to an aircraft's passengers while avoiding possible interference with the aircraft's flight communication and/or control system.

BACKGROUND OF THE INVENTION

Commercial airlines have recently begun providing telephone service to passengers. Typically, an aircraft cabin contains a number of seatbacks that incorporate handsets from which passengers may place calls using credit cards or other payment mechanisms. These handsets are usually hard-wired to the seatbacks and are connected to a central communication control system in the aircraft.

The use of hard-wired handsets in seatbacks, however, presents several problems. Physical wires must be strung from the central communication control system to each of the seatbacks selected for handset placement, resulting in potential difficulties in installation and/or maintenance. Additionally, since the handsets are hard-wired to the seatbacks, a passenger using one of the handsets will likely be restricted in movement by the attached cable connecting the handset to the seatback. As another disadvantage, because many such systems require several passengers to share a single handset, the ability of adjacently seated passengers to simultaneously place calls is limited. Finally, these systems typically only allow passengers to place calls, and do not enable passengers to receive incoming calls.

Recently, other solutions have been proposed to overcome the shortcomings of these hard-wired aircraft phones. These solutions address such issues as allowing a customer to place or receive calls using the customer's own handset. These more recent proposals, however, still suffer from various problems.

U.S. Pat. No. 5,995,833 sets forth a system in which one or more base stations are implemented in an aircraft. While purporting to enable a passenger to use a subscriber-provided radio telephone, this proposal does not indicate how to avoid possible interference with the aircraft's flight control and communication system. The system's use of base stations involves much more than simple relays or repeaters, and instead may use communications equipment that is "intelligent" in the sense that modems, switches, and other devices perform different functions depending on the identity of the users. The use of base stations may also make this proposal relatively expensive.

U.S. Pat. No. 5,519,761 sets forth a first proposal that includes a base station in the aircraft, and a second proposal that does not require such a base station. Neither of these proposals addresses the issue of possible interference with the aircraft's flight control and communication system.

U.S. Pat. No. 5,887,258 sets forth a proposal in which a personal means of radio communication, such as a mobile telephone, may be modified to accept a cable that plugs into an aircraft communication system. While this proposal may address electromagnetic interference with the on-board electronic systems of the aircraft, the use of the cable reduces portability, making this proposal somewhat inconvenient.

These proposed solutions are largely silent on avoiding possible interference with an aircraft's flight control and communication system. Additionally, compliance with applicable aviation regulations may be complicated by the use of copper or other metallic conductors, such as coaxial cable, set forth in some of these proposals. Besides acting as possible antennas, these metallic conductors may present a risk of sparking thereby posing a potential fire hazard and serving as an additional potential source of RF interference.

Aircraft instrumentation is often extremely sensitive so that potential interference must be carefully controlled. Because relatively long lengths of wire and cable are often bundled together due to space constraints in an aircraft, the possibility of interference is magnified.

Thus, there is a need for a wireless communication system that enables a passenger to utilize a wireless handset on an aircraft without requiring hard-wired connections to the handset. Such a system should not necessarily require a base station in the aircraft. The system should be designed to avoid any possible interference with the aircraft's flight communication and control system, and should not significantly increase the likelihood of fire or explosion with the aircraft.

SUMMARY OF THE INVENTION

In accordance with an illustrative embodiment of the present invention, some of the problems associated with existing aircraft communication systems are addressed.

In a first embodiment, a system for providing wireless communication services to passengers of an aircraft includes an external antenna, a cabin antenna, and a signal pathway linking the external antenna to the cabin antenna. The signal pathway includes a low-energy transmission medium to help decrease any potential interference with sensitive equipment, such as the aircraft's flight communication and control system. The low-energy transmission medium may be non-metallic, such as optical fiber, for example. One or more repeaters may be included to amplify and relay the signal. Converters may be included to convert signals for transmission between different media types, such as from coaxial cable to optical fiber to radio frequency. If one or more repeaters are present, they may operate on more than one frequency range.

In another embodiment, a method for providing wireless communication service to a passenger compartment of an aircraft includes receiving at an external antenna an incoming signal from a base station. The incoming signal is converted to an incoming low-energy signal. The incoming low-energy signal is conveyed across a low-energy transmission medium and is converted to an internal incoming signal. The internal incoming signal is transmitted into the passenger compartment for reception by one or more wireless handsets. The low-energy transmission medium may be non-metallic, such as optical fiber, for example. The steps of repeating and converting the incoming external signal may be performed in an electromagnetically isolated portion of the aircraft to help to help decrease any potential interference with sensitive equipment, such as the aircraft's flight communication and control system.

In yet another embodiment, a method for providing wireless communication service to a passenger compartment of an aircraft includes receiving an outgoing internal signal from a wireless handset located in the passenger compartment. The outgoing internal signal is converted to an outgoing low-energy signal, such as light energy on a fiber optic cable. The outgoing low-energy signal is conveyed across a low-energy transmission medium and is converted to an outgoing external signal. The outgoing external signal is transmitted for reception by a base station.

In still yet another embodiment, a system for providing wireless communication service to a passenger compartment of an aircraft includes an external antenna operable to receive an incoming external signal from and transmit an outgoing external for reception by a base station. A repeater having an amplifier may be included to repeat the incoming and outgoing signals. First and second converters may be included to convert between signal types, such as between light energy and radio frequency signals. The second converter may be part of a cabin antenna unit, which is operable to transmit signals to and receive signals from one or more wireless handsets. The first and second converters may be linked via a fiber optic cable or other low-energy transmission medium to help decrease any potential interference with sensitive equipment, such as the aircraft's flight communication and control system

BRIEF DESCRIPTION OF THE DRAWINGS

Preferred embodiments of the present invention are described with reference to the following drawings, wherein.

DETAILED DESCRIPTION

Figure 1:
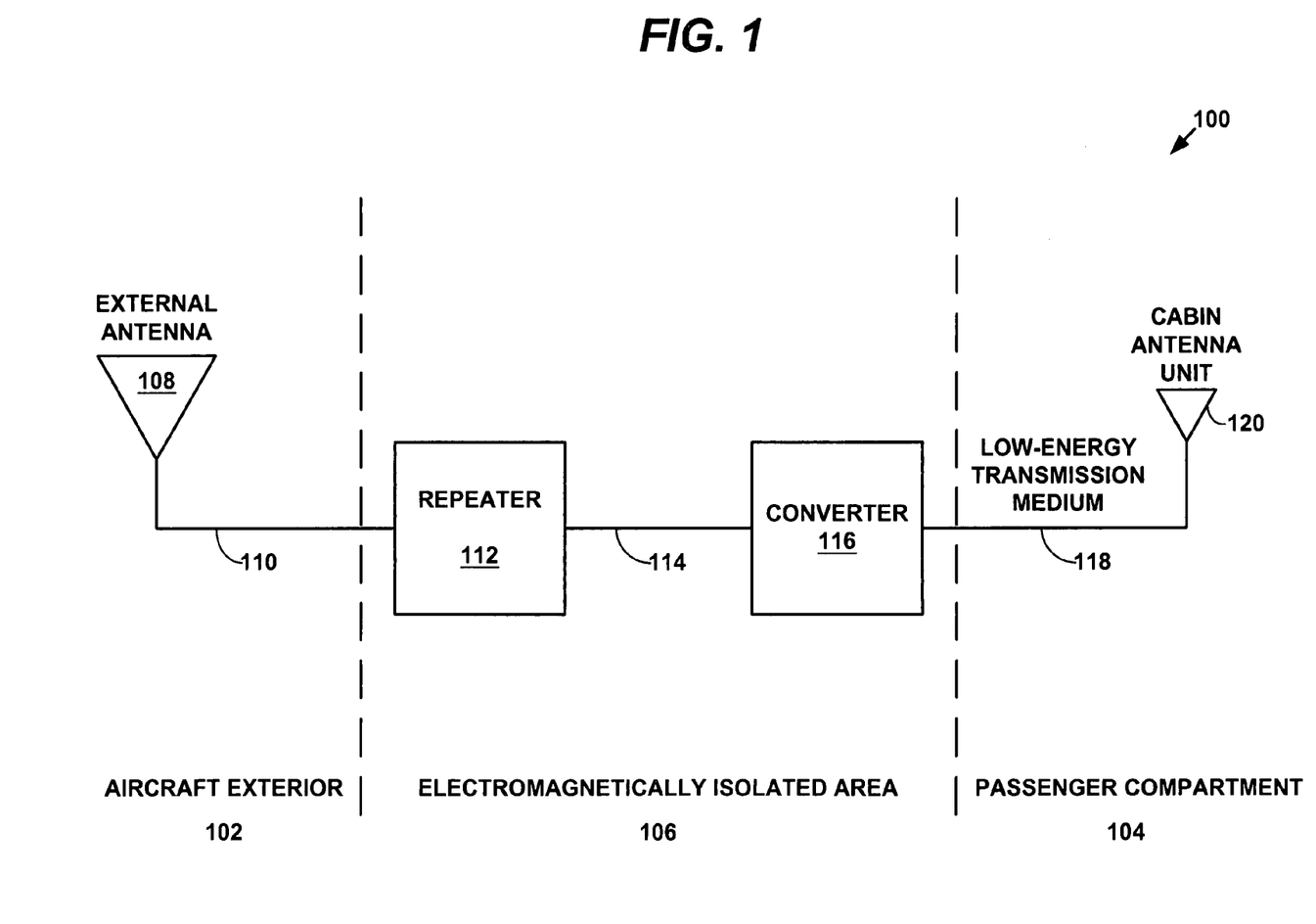
FIG. 1 is a simplified block diagram illustrating an aircraft wireless communication system according to an exemplary embodiment of the present invention.

FIG. 1 is a simplified block diagram illustrating an aircraft wireless communication system 100 according to an embodiment of the present invention. The system 100 includes a first portion 102 that is substantially on the exterior of the aircraft, a second portion 104 that is substantially within the passenger compartment, and a third portion 106 that is substantially within an electromagnetically isolated area. One or more of the portions 102–106 may be combined without departing from embodiments of the present invention. Similarly, additional portions beyond portions 102–106 may be included. The electromagnetically isolated area may be located outside the aircraft in one embodiment.

The portion 102 includes an external antenna 108. The external antenna 108 may be a belly antenna or a tail antenna, for example. Other antenna locations may also be utilized. In some cases, the external antenna 108 may actually be at least partially internal to the aircraft if known measures are taken to avoid significant deterioration of the antenna's transmission capabilities. A first transmission medium 110 may be connected to the external antenna 108 and may include at least one coaxial cable for conveying communication signals, such as RF signals, to and from the external antenna 108. Implementations other than coaxial cable(s) may also be used. For example, optical fiber, twisted pair(s), or RF transmission may be used. Alternatively, the external antenna 108 may be directly attached to or included within another part of the system 100. For example, the external antenna 108 may be mounted directly on the chassis of a repeater or other component. In such a case, there would be no need for the first transmission medium 110 because signals would likely be conveyed through internal circuitry and connections.

The second portion 106 may include a repeater 112 connected to a transmission medium converter 116 by a second transmission medium 114. The external antenna 108 may be connected to the repeater 112 by the first transmission medium 110. The second transmission medium 114 may include one or more coaxial cables or other types of transmission media that are known by those skilled in the art. In some cases, the repeater 112 and the transmission medium converter 116 may be combined, so that there may be no need for the second transmission medium 114.

The repeater 112 repeats the incoming external signal received at the external antenna 108. This may include performing such functions as amplification, conditioning, and/or noise removal, for example. Besides operating on incoming external signals received through the external antenna 108, the repeater 112 may also repeat outgoing external signals received from within the aircraft for transmission through the external antenna 108 to a base station antenna on the ground. In one embodiment, the repeater 112 relays signals to and from a base station situated at a remote location from the aircraft, such as on the ground or on a building. In an alternative embodiment, the system is essentially passive, and the repeater 112 is omitted.

In some cases, it may advantageous to include multiple repeaters. For example, if two frequency ranges are being amplified (such as to support two different wireless technologies), then two repeaters may produce better results than one repeater produces. Possible exemplary frequency ranges include from approximately 400 MHz to approximately 500 MHz, from approximately 800 MHz to approximately 900 MHz, and from approximately 1800 MHz to approximately 1900 MHz. Other frequency ranges may also be used in various embodiments of the present invention. The ranges will typically correspond to the frequencies in use by service providers.

The transmission medium converter 116 serves to convert from one medium to another, such as from coaxial cable to optical fiber, and vice-versa. Additionally, the transmission medium converter 116 may also be used to implement a distributed antenna system within the passenger compartment portion 104. In such a system, there may be more than one cabin antenna unit 120 in the passenger compartment 104, and the transmission medium converter 116 may connect the at least one cabin antenna unit 120 to the rest of the wireless communication system, including the repeater 112 and the external antenna 108. In addition, there may be more than one signal type and/or frequency transmitted from the at least one cabin antenna unit 120.

The portion 104 inside the passenger compartment may include a low-energy transmission medium 118 and at least one cabin antenna unit 120. The cabin antenna unit 120 enables communication of incoming and outgoing internal signals with wireless handsets used by passengers. The cabin antenna unit 120 may include at least one cabin antenna and at least one converter for converting outgoing internal signals received from wireless handsets into signals that are suitable for transmission on the low-energy transmission medium 118, and vice-versa. For example, the cabin antenna unit 120 may convert an RF signal received from a handset into light energy for transmission on an optical fiber, and vice-versa. The cabin antenna unit 120 may be positioned to minimize interference with sensitive equipment, such as the aircraft's flight control and communication system. For example, if an aircraft's passenger compartment includes two cabin antenna units 120, the first antenna unit 120 may be placed at the front of the passenger compartment (near the cockpit) in such a way that the transmission pattern is directed substantially away from the cockpit. Because an aircraft's flight control and communication system is often located substantially in the cockpit area, any potential interference may be reduced by minimizing the back lobe energy from the first antenna unit 120. The second antenna unit 120 may be placed at the rear of the passenger compartment in such a way that the antenna transmissions are much weaker near the front of the passenger aircraft (near the cockpit) than near the rear of the passenger aircraft.

The low-energy transmission medium 118 is selected to reduce the likelihood of any possible interference with the aircraft's flight control and communication system. The term "low-energy transmission medium" is defined herein to mean a transmission medium having lower electromagnetic emissions levels than exhibited by standard coaxial cable. The term "low-energy signal" refers to a signal, such as light energy, being conveyed on a low-energy transmission medium. The phrase "low-energy" is not intended to describe the characteristics of the signal being conveyed, but is instead intended to describe the external emissions resulting from the signal being conveyed on the transmission medium. The low-energy signal preferably exhibits no more electromagnetic emissions than are tolerable by proximate equipment, such as a portion of a flight communication and control system, for example. The low-energy transmission medium 118 is preferably one or more optical fiber segments connecting the cabin antenna unit 120 to the transmission medium converter 116. Other nonmetallic transmission media types may also be used, as may some metallic types that are well shielded. Because optical fiber conveys light energy but is a poor conductor of electricity, any possible electromagnetic interference is likely to be greatly reduced from what might otherwise exist if other types of transmission media, such as coaxial cable, were to be used. Thus, if optical fiber is used to implement the low-energy transmission medium 118, then the transmission medium converter 116 will function to convert an incoming external signal, such as an RF signal, to an incoming low-energy signal, such as an optical signal composed of light energy. Likewise, the cabin antenna unit 120 will convert the incoming low-energy signal to an incoming internal signal that may be used by a passenger's wireless handset. For example, the cabin antenna unit 120 may convert the light energy to an RF signal, and may convert an RF signal received from a passenger's wireless handset to light energy to be conveyed across the low-energy transmission medium 118.

Figure 2:
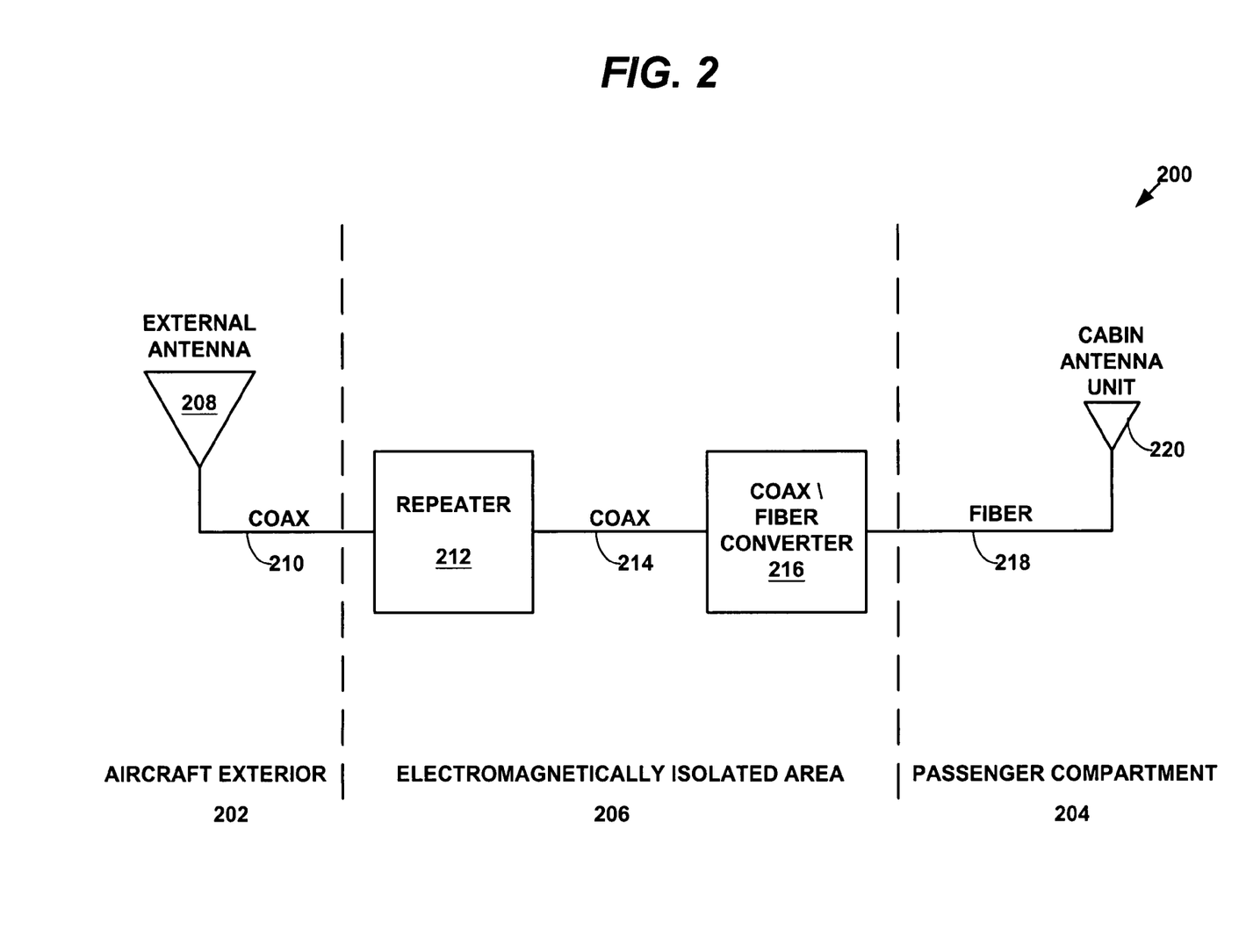
FIG. 2 is a simplified block diagram illustrating an aircraft wireless communication system according to an exemplary embodiment of the present invention.

FIG. 2 is a simplified block diagram illustrating an aircraft wireless communication system 200, according to an exemplary embodiment of the present invention. The system 200 illustrates an implementation in which a coaxial cable 210 is used to connect an external antenna 208 to a repeater 212, and to connect the repeater 212 to a coax/fiber converter 216. At least one cabin antenna unit 220 is linked to the coax/fiber converter 216 by an optical fiber distribution system 218.

Figure 3:
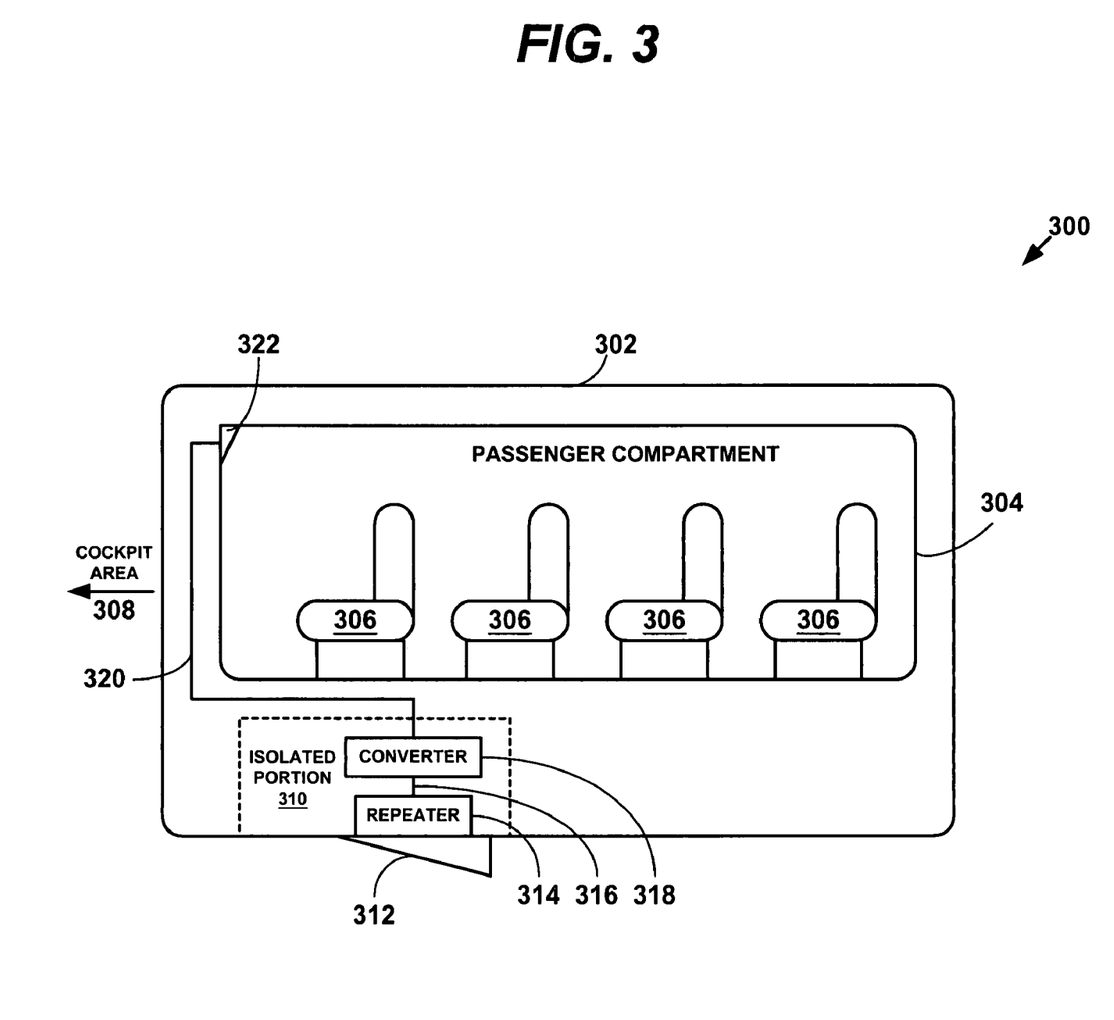
FIG. 3 is a simplified block diagram illustrating an aircraft wireless communication system according to an exemplary embodiment of the present invention.

FIG. 3 is a simplified block diagram illustrating an aircraft wireless communication system 300, according to an exemplary embodiment of the present invention. An aircraft fuselage portion 302 includes a passenger compartment 304 having a number of passenger seats 306. A cockpit area 308 is also shown. An electromagnetically isolated portion 310 helps to prevent electromagnetic interference of the wireless communication system with the aircraft's flight control and communication system. Electromagnetic isolation may be provided by appropriate shielding and/or placement away from sensitive equipment.

The wireless communication system includes at least one external antenna 312, at least one cabin antenna unit 322, and a low-energy transmission medium 320 serving as at least a portion of a signal pathway linking the at least one external antenna 312 to the at least one cabin antenna unit 322. The signal pathway may further include at least one repeater 314, a transmission medium 316, and a transmission medium converter 318. One or more of these individual components may be combined with one or more other components, which may result in the absence of a particular transmission medium, such as a connecting cable. Instead connectivity may be obtained through internal connections, for example.

The external antenna 312 may be a belly antenna or a tail antenna. Other choices for antenna placement may also be used. The external antenna 312 is operable to transmit and receive at least one external signal between the aircraft and a base station located at a different location, such as on the ground or on a building.

The repeater 314 is operable to convey an incoming external signal received by the external antenna 312 to additional portions of the wireless communication system, such as the converter 318. The repeater may be connected to the external antenna 312 by a transmission medium, such as a coaxial cable. Alternatively, the repeater 314 may be directly connected to the external antenna 312, as is shown in FIG. 3. The repeater 314 repeats the incoming external signal received at the external antenna 312, which may include performing such functions as amplification, conditioning, noise removal, or other similar functions. Besides operating on incoming external signals received through the external antenna 312, the repeater 314 may also repeat signals received by the cabin antenna unit 322 for transmission through the external antenna 312 to a base station. Multiple repeaters may also be used, and the placement of the repeater 314 may be altered from what is shown in FIG. 3. The repeater may be one or more R1910C repeaters from Watkins-Johnson of Palo Alto, Calif., for example. In a passive embodiment, the repeater(s) may be omitted entirely.

The transmission medium converter 318 may be connected to the repeater 314 by a transmission medium 316. The transmission medium 316 may be one or more coaxial cables, for example. Because the repeater 314, transmission medium 316, and the converter 318 are preferably located in the isolated portion 310, there may be a reduced risk of electromagnetic interference from what might otherwise exist if the transmission medium 316 were located outside of the isolated portion 310. The converter 318 converts an incoming external signal received from the repeater 314 on the transmission medium 316 for transmission across the low-energy transmission medium 320. For example, the transmission medium 316 may be a coaxial cable operable to convey RF signals. The low-energy transmission medium 320 may be one or more optical fibers operable to convey light energy between the converter 318 and the cabin antenna unit 322. In this case, the converter 318 converts RF signals into light energy and vice versa. The converter 318 may, for example, be selected from the RFiber™ or Litenna™ line of products offered by Foxcom Wireless of Jerusalem, Israel and Vienna, Va. Other similar devices may also be used, such as one or more devices from the LGCell Equipment line of products offered by L.G.C. of San Jose, Calif., or from Allen Telecom Group of Dallas, Tex. A combined repeater/converter may be used instead of the separate repeater 314 and converter 318 that are shown in the system 300. The availability, performance, and pricing of commercial off-the-shelf products may contribute to a decision to use one implementation versus another.

The low-energy transmission medium 320 is preferably single mode optical fiber to provide sufficient bandwidth to support multiple handsets and/or data-intensive applications running on the handset(s). Although the low-energy transmission medium 320 is shown outside of the passenger compartment 304, this is for convenience only, and at least a portion of the low-energy transmission medium 320 may be within the passenger compartment 304. The low-energy transmission medium 320 helps to avoid emission of RF signals within the aircraft, which might otherwise interfere with the aircraft's flight control and communication systems.

The cabin antenna unit 322 is a remote antenna unit that converts incoming low-energy signals conveyed on the low-energy transmission medium 320 to incoming internal signals that are usable by one or more handsets in the passenger compartment 304. For example, the cabin antenna unit 322 may convert light energy to RF signals, and vice versa. The placement of the cabin antenna unit 322 may be determined using standard RF engineering methods known by those having skill in the art. The RFiber™ and Litenna™ product lines from Foxcom Wireless include devices that may be used to implement the cabin antenna unit 322. Similarly, ChrisCraft of Manchester, N.H. offers a remote antenna unit that may be used in various embodiments of the present invention. LGC and Allen Telecom Group provide similar products. The cabin antenna unit 322 is preferably designed to exhibit a high front-to-back ratio to lessen any potential interference with the aircraft's flight control and communication system. The cabin antenna unit 322 is also preferably positioned to ensure that the repeater 314 maintains stable operation and does not suffer from feedback due to cross-reception between the external antenna 312 and the cabin antenna unit 322, as will be understood by those having skill in the field of antenna theory.

Figure 4:
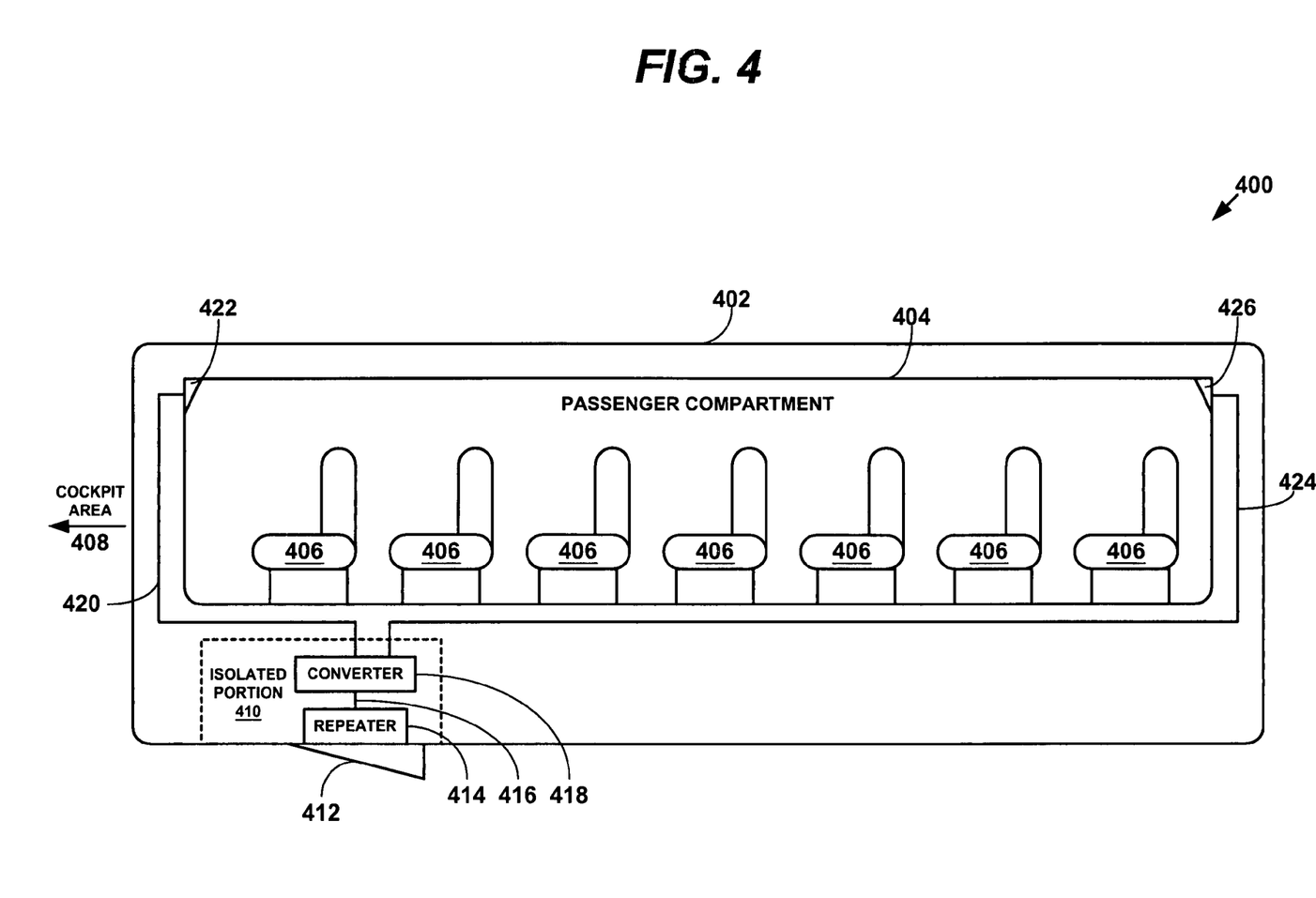
FIG. 4 is a simplified block diagram illustrating an aircraft wireless communication system according to an exemplary embodiment of the present invention.

FIG. 4 is a simplified block diagram illustrating an aircraft wireless communication system 400 according to an exemplary embodiment of the present invention. The system 400 differs from the system 300 shown in FIG. 3 in its inclusion of a second cabin antenna unit 426 linked to the converter 418 by a second low-energy transmission medium 424. Other parts of the system 400 are similar to those shown in the system 300. The distribution system connecting the converter 418 to the cabin antenna units 422 and 426 may be other than what is shown in FIG. 4. For example, a fiber optic bus system may be used instead of the arrangement shown with the low-energy transmission media 420 and 424.

A handset for use with the present invention may be a passenger's wireless handset, such as a portable handheld phone, a pager, or a personal digital assistant (PDA) having wireless capabilities. The handset is also preferably usable outside the aircraft with a conventional terrestrial wireless communication system. A variety of different proprietary and standard wireless technologies, such as IS95, IS136, 3G, IS54, GSM, AMPS, TACS, JTACS, CDMA 900, CDMA 1.8, Nextel, EMSR (iDen), NMT, and others, may be supported by systems 100, 200, 300, and 400.

Because the systems 100, 200, 300, and 400 may make use of one or more repeaters in the aircraft instead of a dedicated base station in the aircraft, more than one wireless technology may be supported. The repeater(s) will simply pass on (relay) appropriate signals between base stations and handsets corresponding to the same technology. Because different wireless technologies utilize similar frequencies, a single repeater may be usable with more than one technology. Where frequencies ranges for different wireless technologies are too far apart to allow efficient amplification from a single repeater, more than one repeater may be more effective. For example, it may be feasible to use one repeater to relay frequencies in the 800 and 900 MHz bands, and a second repeater to relay frequencies in the 1.8 and 1.9 GHz bands. Alternatively, an upband/downband converter may be included to recognize and convert signals from one frequency into signals of another frequency.

Figure 5:
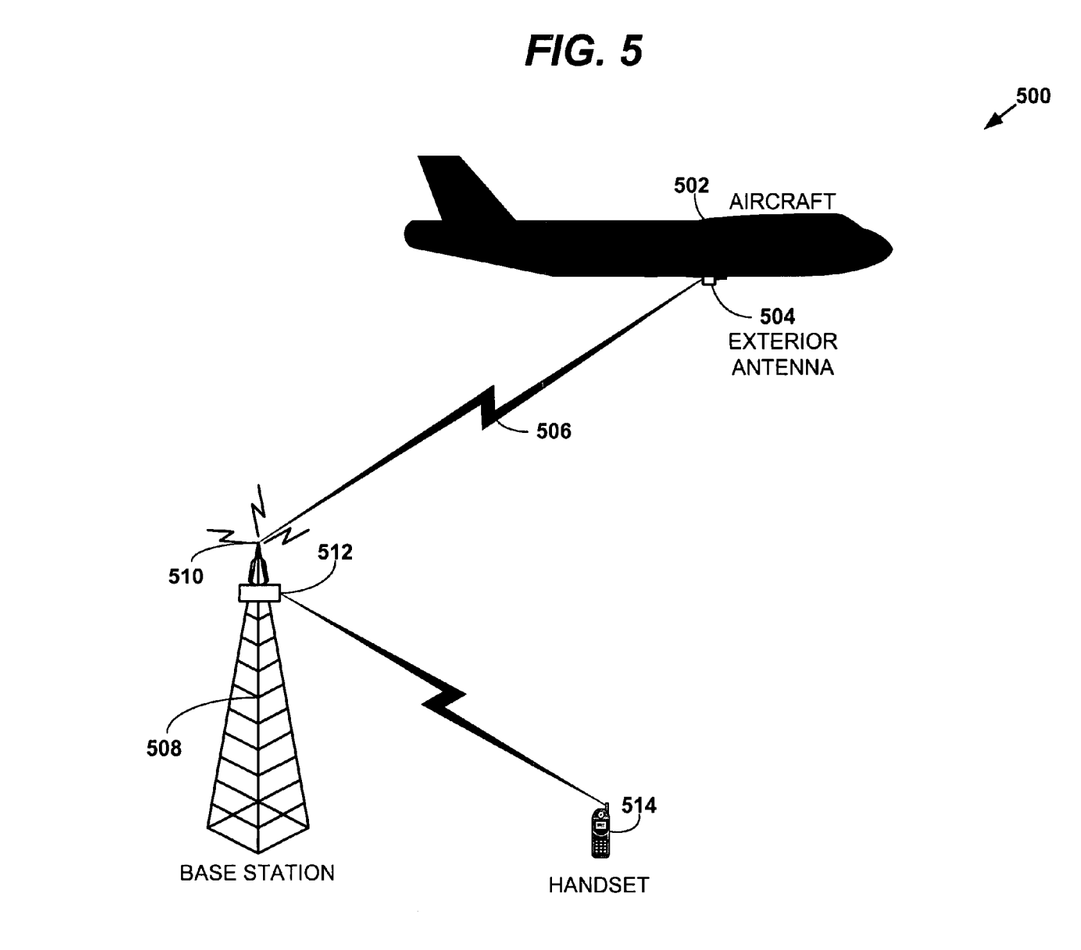
FIG. 5 is a simplified block diagram illustrating a wireless communication system, including an aircraft wireless communication system, according to an exemplary embodiment of the present invention.

FIG. 5 is a simplified block diagram illustrating a wireless communication system 500, including an aircraft wireless communication system, according to an exemplary embodiment of the present invention. The system 500 includes an aircraft 502 having an external antenna 504. The external antenna 504 allows communication between passengers on the aircraft 502 and a base station 508. The base station 508 may include an air/ground antenna 510 and a conventional terrestrial antenna 512. The air/ground antenna 510 enables communications with the aircraft 502, while the terrestrial antenna 512 provides wireless communication service to a handset 514 for use on the ground. The air/ground antenna 510 and the terrestrial antenna 512 are linked to at least one base transceiver system (not shown), which may be connected to the Public Switched Telephone Network (PSTN) or some other communication network, for example.

The air/ground antenna 510 on the base station 508 and the external antenna 504 communicate incoming and outgoing external signals via an air interface. The air/ground antenna has a energy pattern that is substantially pointed skyward, so that the airspace surrounding the base station 508 is substantially within the energy pattern. The air/ground energy pattern preferably is insubstantial at locations on the ground. For example, the air/ground energy pattern may be substantially hemispherical in shape and may be directed away from the ground. The signals transceived to and from the air/ground antenna preferably are at conventional wireless frequencies, such as the 800–900 MHz or 1.8–1.9 GHz ranges, for example.

Figure 6:
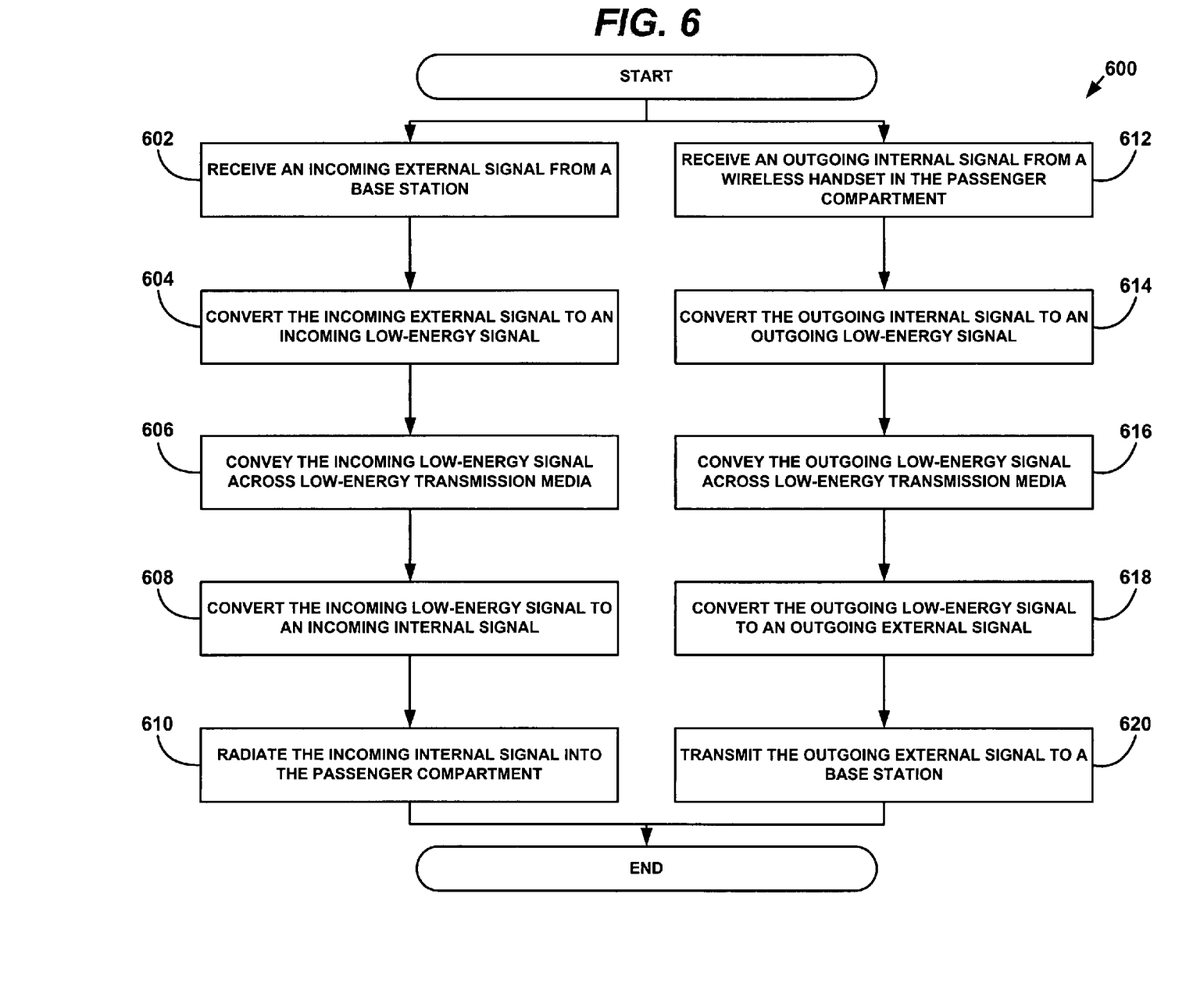
FIG. 6 is a flow diagram illustrating a method for providing wireless communication service to an aircraft's passenger compartment according to an exemplary embodiment of the present invention.

FIG. 6 is a flow diagram illustrating a method 600 for providing wireless communication service to an aircraft's passengers according to an embodiment of the present invention. The method 600 includes two processes or methods that may occur in parallel. The first process (steps 602–610) is used to communicate signals from a base station to a passenger's handset on the aircraft. The second process (steps 612–620) is used to communicate signals from the passenger's handset to the base station.

In step 602, an incoming external signal is received from a base station at the aircraft. The incoming external signal may be repeated, which may include amplification, signal conditioning, and other relaying functions. In step 604, the incoming external signal is converted to an incoming low-energy signal, such as an optical signal composed of light energy. In step 606, the incoming low-energy signal is conveyed across low-energy transmission media. The low-energy transmission media may, for example, be one or more fiber optic cables. In step 608, the incoming low-energy signal is converted to an incoming internal signal, such as an RF signal usable by a passenger's handset. In step 610, the incoming internal signal is transmitted into the passenger compartment so that it may be received by a passenger's wireless handset.

A process for communicating signals from a wireless handset to a base station is preferably performed in parallel with the process for communicating signals from the base station to the wireless handset. In step 612, an outgoing internal signal is received from a wireless handset in the passenger compartment. In step 614, the outgoing internal signal is converted to an outgoing low-energy signal, such as an optical signal composed of light energy. In step 616, the outgoing low-energy signal is conveyed across low-energy transmission media. In step 618, the outgoing low-energy signal is converted to an outgoing external signal. In step 620, the outgoing external signal is transmitted to a base station.

The aircraft wireless communication described herein may be altered somewhat without departing from the intended scope of the present invention. For example, different amplification techniques may be used from what has been described. In addition, the placement of various components may differ from what is shown in FIGS. 1–5. Various modifications may be made to accommodate a variety of wireless technologies. Lastly, although the techniques disclosed herein were discussed with reference to an aircraft, the concepts may be applicable to other environments in which avoidance of potential electromagnetic interference is desired. For example, other transportation vehicles, such as trains or ships having sensitive communications and/or control circuitry may find the presently disclosed invention to be useful for avoiding potential electromagnetic interference, as may certain other structures.

Preferred and alternative embodiments of the present invention have been illustrated and described. It will be understood, however, that changes and modifications may be made to the invention without deviating from its true spirit and scope, as defined by the following claims.

I claim:

1. A system for providing wireless communication service to a passenger compartment of an aircraft, comprising in combination:

an external antenna located on an exterior portion of the aircraft, the external antenna operable to receive an incoming external signal from and transmit an outgoing external signal to a terrestrial base station;

a cabin antenna located in the passenger compartment of the aircraft, wherein the cabin antenna is oriented such that a transmission pattern of the cabin antenna is substantially directed away from a cockpit area of the aircraft to minimize interference with a flight and control system of the aircraft, the flight and control system being substantially located in the cockpit area, and wherein the cabin antenna is additionally configured with a high front-to-back ratio to substantially minimize back lobe energy directed toward the cockpit area, thereby further reducing interference to the flight and control system of the aircraft; and a signal pathway linking the external antenna to the cabin antenna, wherein at least a portion of the signal pathway includes at least one low-energy transmission medium.

2. The system of claim 1, wherein the low-energy transmission medium is non-metallic.

3. The system of claim 1, wherein the low-energy transmission medium comprises at least one optical fiber.

4. The system of claim 3, wherein the at least one optical fiber has a first fiber end and a second fiber end, and wherein the signal pathway additionally comprises:

a repeater; and first and second converters operable to convert RF signals to light energy and to convert light energy to RF signals, wherein the first converter is located at the first fiber end and the second converter is located at the second fiber end.

5. The system of claim 4, wherein the repeater includes an amplifier.

6. The system of claim 4, further comprising at least one amplifier operable to amplify a first frequency range and a second frequency range.

7. A method for providing wireless communication service to a passenger compartment of an aircraft, comprising in combination:

receiving at an external antenna at least one incoming external signal from a terrestrial base station, wherein the external antenna is located on the aircraft;

converting the at least one incoming external signal into at least one incoming low-energy signal;

conveying the at least one incoming low-energy signal across a low-energy transmission medium;

converting the at least one incoming low-energy signal into at least one internal incoming signal; and transmitting from a cabin antenna the at least one internal incoming signal into the passenger compartment, wherein the cabin antenna is oriented such that a transmission pattern of the antenna system is substantially directed away from a cockpit area of the aircraft to minimize interference with a flight and control system of the aircraft, the flight and control system being substantially located in the cockpit area, and wherein the cabin antenna is additionally configured with a high front-to-back ratio to substantially minimize back lobe energy directed toward the cockpit area, thereby further reducing interference to the flight and control system of the aircraft.

8. The method of claim 7, wherein the low-energy transmission medium includes at least one optical fiber, and wherein the at least one incoming low-energy signal is composed of light energy.

9. The method of claim 7, wherein the at least one external antenna is located on an exterior portion of the aircraft.

10. The method of claim 7, further comprising repeating the at least one incoming external signal.

11. The method of claim 7, wherein the steps of receiving and converting the at least one incoming external signal are performed at a location outside the passenger compartment.

12. The method of claim 7, wherein the incoming external signals and the incoming internal signals are RF signals.

13. The method of claim 12, wherein repeating the at least one incoming external signal includes amplifying the at least one incoming external signal.

14. The method of claim 12, wherein the steps of repeating and converting the at least one incoming external signal are performed in an electromagnetically isolated portion of the aircraft.

15. A method for providing wireless communication service to a passenger compartment of an aircraft, comprising in combination:

receiving at a cabin antenna at least one outgoing internal signal from a wireless handset located in the passenger compartment, wherein the cabin antenna is oriented such that a transmission pattern of the antenna system is substantially directed away from a cockpit area of the aircraft to minimize interference with a flight and control system of the aircraft, the flight and control system being substantially located in the cockpit area, and wherein the cabin antenna is additionally configured with a high front-to-back ratio to substantially minimize back lobe energy directed toward the cockpit area, thereby further reducing interference to the flight and control system of the aircraft;

converting the at least one outgoing internal signal into at least one outgoing low-energy signal;

conveying the at least one outgoing low-energy signal across a low-energy transmission medium;

converting the at least one outgoing low-energy signal to at least one outgoing external signal; and transmitting the at least one outgoing external signal to a terrestrial base station.

16. The method of claim 15, wherein the low-energy transmission medium includes at least one optical fiber, and wherein the at least one outgoing low-energy signal is composed of light energy.

17. The method of claim 15, wherein the at least one external antenna is located on an exterior portion of the aircraft.

18. The method of claim 15, wherein the step of converting the at least one low-energy outgoing signal and the step of transmitting the at least one outgoing external signal are performed at a location outside the passenger compartment.

19. The method of claim 15, wherein the outgoing internal signal and the outgoing external signal are RF signals.

20. The method of claim 15, further comprising repeating the at least one outgoing external signal.

21. The method of claim 20, wherein repeating the at least one outgoing external signal includes amplifying the at least one outgoing external signal.

22. The method of claim 20, wherein the step of converting the at least one outgoing low-energy signal and the step of repeating the at least one outgoing external signal are performed in an electromagnetically isolated portion of the aircraft.

23. A system for providing wireless communication service to a passenger compartment of an aircraft, comprising in combination:

an external antenna mounted on an exterior portion of the aircraft, wherein the external antenna is operable to receive an incoming external signal from and transmit an outgoing external signal to a terrestrial base station;

a repeater including at least one amplifier, wherein the repeater is operable to repeat the incoming external signal and an outgoing external signal;

a first converter operable to convert the incoming external signal to an incoming optical signal and to convert an outgoing optical signal to the outgoing external signal;

at least one cabin antenna unit having a cabin antenna and a second converter, wherein the second converter is operable to convert the incoming optical signal into an incoming internal signal, wherein the cabin antenna is operable to transmit the incoming internal signal to a wireless handset located in the passenger compartment and to receive an outgoing internal signal from the wireless handset, and wherein the second converter is operable to convert the outgoing internal signal to the outgoing optical signal, and wherein the cabin antenna is oriented such that a transmission pattern of the cabin antenna is substantially directed away from a cockpit area of the aircraft to minimize interference with a flight and control system of the aircraft, the flight and control system being substantially located in the cockpit area, and wherein the cabin antenna is additionally configured with a high front-to-back ratio to substantially minimize back lobe energy directed toward the cockpit area, thereby further reducing interference to the flight and control system of the aircraft; and at least one fiber optic cable operable to convey the incoming optical signal from the first converter to the at least one cabin antenna unit and to convey the outgoing optical signal from the at least one cabin antenna unit to the first converter.

24. The system of claim 23, wherein the incoming external signal, the incoming internal signal, the outgoing internal signal, and the outgoing external signal are RF signals.

* * * * *